United States Patent [19]
Hein

[11] Patent Number: 6,152,174
[45] Date of Patent: Nov. 28, 2000

[54] SURGE POT FOR ARRANGEMENT IN A FUEL TANK OF A MOTOR VEHICLE

[75] Inventor: Michael Hein, Heusenstamm, Germany

[73] Assignee: Mannesmann VDO AG, Frankfurt, Germany

[21] Appl. No.: 09/010,207

[22] Filed: Jan. 21, 1998

[30] Foreign Application Priority Data

Feb. 11, 1997 [EP] European Pat. Off. .............. 97120429

[51] Int. Cl.⁷ .................................................... E03B 11/00
[52] U.S. Cl. .......................... 137/576; 137/592; 137/574; 123/509; 123/514
[58] Field of Search ................................... 123/509, 510, 123/514; 137/574, 576, 592

[56] References Cited

U.S. PATENT DOCUMENTS

| | | | |
|---|---|---|---|
| 1,797,533 | 3/1931 | Stokes .................................. | 123/510 |
| 2,971,576 | 2/1961 | Anker .................................. | 137/576 |
| 4,869,225 | 9/1989 | Nagata et al. ........................ | 123/509 |
| 5,038,741 | 8/1991 | Tuckey ................................. | 123/514 |
| 5,787,865 | 8/1998 | Harris et al. ........................ | 123/509 |

*Primary Examiner*—A. Michael Chambers
*Attorney, Agent, or Firm*—Martin A. Farber

[57] ABSTRACT

A surge pot intended for mounting in a fuel tank has a walling with a circumferential elastic insert. In this way, the surge pot has in a mounting position a small cross section with which it can be passed through a mounting opening in the fuel tank. After the mounting, the elastic insert is pressed outward so that the surge pot can receive a particularly large amount of fuel.

7 Claims, 2 Drawing Sheets

SURGE POT FOR ARRANGEMENT IN A FUEL TANK OF A MOTOR VEHICLE

FIELD AND BACKGROUND OF THE INVENTION

The present invention relates to a surge pot to be arranged in a fuel tank of a motor vehicle which is intended to be introduced through a mounting opening in the fuel tank and has a container bottom and a side wall.

Such surge pots are used in motor vehicles for collecting fuel from a fuel tank which is almost empty. In this way, the surge pot provides assurance that there is a sufficient supply of fuel to the internal combustion engine of the vehicle for instance upon travel around curves or up gradients. The surge pot is, a as rule, introduced through a mounting opening present in the top of the fuel tank and is, as a rule, secured against the bottom of the fuel tank for the fastening thereof in the fuel tank. In this way, the mounting of the feed unit with the surge pot is particularly simple.

Modern motor vehicles require a surge pot of particularly large volume since even a brief interruption in the supply of fuel can, for instance, cause damage to the catalytic converter and therefore must be definitely avoided. Furthermore, a fuel pump and other parts of a fuel feed system for the internal combustion engine are arranged in the surge pot, they however limiting the volume of the surge pot.

If the dimensions of the surge pot were to be increased, this would require a correspondingly large mounting opening in the top of the fuel tank. A large mounting opening must, however, be sealed-off in expensive fashion in order to avoid evaporation of the fuel. Furthermore, the fuel tanks of modern motor vehicles are frequently constructed with a large number of angles so that the mounting opening cannot be made as large as might be desired.

SUMMARY OF THE INVENTION

An object of the invention is to develop a surge pot of the aforementioned type having increased volume while requiring minimal mounting.

In accordance with the invention, the surge pot is expanded from a mounting position of small cross section, intended for passage through the mounting opening of the fuel tank, into a normal position of large cross section.

By this shaping, the surge pot, in its normal position mounted in the fuel tank, can receive a large amount of fuel and thus assure the reliability of the feed of fuel to the internal combustion engine even upon lengthy travel around curves or up hills. In the mounted position, the surge pot, however, has a small cross section as compared with the normal position and can thus be introduced into the fuel tank through a relatively small mounting opening.

In accordance with one further advantageous development of the invention, the surge pot is suitable for mounting in angular fuel tanks provided that wall of the surge pot has at least one resilient insert. This resilient insert can, for instance, be stretched outwards in its normal position, or outwardly swingable parts of surge pot walling seal off against stationary parts of the surge pot.

In the normal position, the surge pot has a particularly large volume and, in the mounted position, a small cross section for the case wherein the resilient insert extends around the entire circumference of the surge pot. In this way, the surge pot has a narrow, elongated shape in the mounting position. In the normal position, the resilient insert can be pressed outward. The surge pot then has a bulged shape.

In accordance with another advantageous embodiment of the invention, the surge pot can be produced at favorable cost if its lateral walling has at least one flat wall which is fastened swingably outward by a film hinge to an edge of the bottom of the tank, which the swinging can take place in the normal position. The wall and the film hinge can, for instance, be made in a single part with the other components of the surge pot from plastic by injection molding.

In accordance with another advantageous development of the invention, the surge pot has, in its normal position, a high stability if the walling has a folded bellows with folds extending to the bottom of the container. The folded bellows can extend around part or all of the circumference of the surge pot or else be inserted in order to seal off a movable wall from stationary parts of the surge pot. Since the folded bellows can be easily produced in a single piece with the other parts of the surge pot by injection molding, this development leads to a further reduction in the cost of manufacture of the surge pot.

The surge pot can, in accordance with another advantageous development of the invention, pass through particularly small mounting openings if it is made completely of a resilient material.

The mounting of the surge pot is particularly simple, in accordance with another advantageous development of the invention, if it has a spring element for a prestressing of the surge pot into the normal position. By this development, no expensive locking of the surge pot in operating position is necessary. As spring element a separate spring can, for instance, be used. As an alternative to this, the folded bellows or the elastic insert could prestress the surge pot into the normal position.

BRIEF DESCRIPTION OF THE DRAWINGS

With the above and other objects and advantages in view, the present invention will become more clearly understood in connection with the detailed description of a preferred embodiment, when considered with the accompanying drawings, of which.

DETAILED DESCRIPTION OF THE PREFERRED EMBODIMENT

Figure 1:
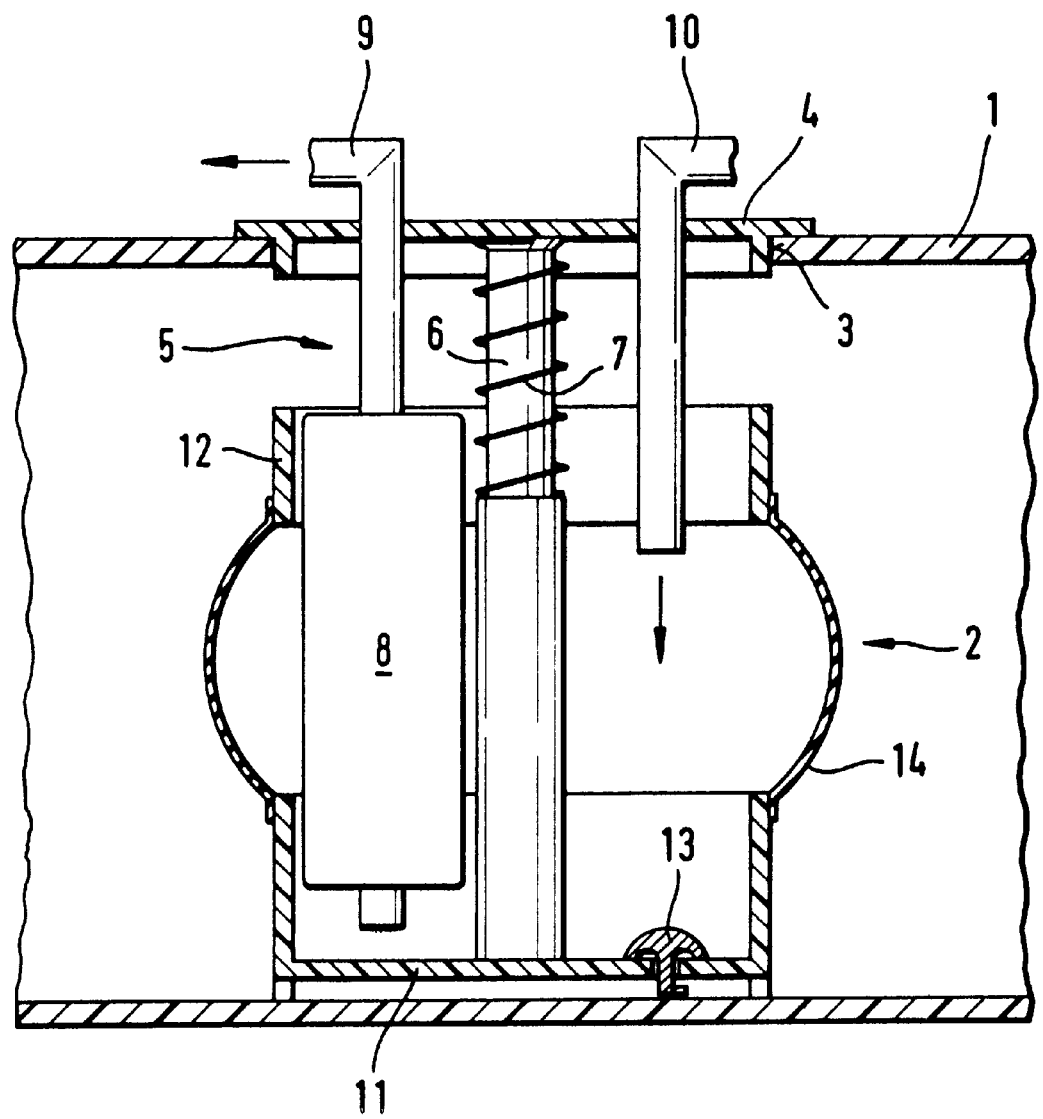
FIG. 1 is a sectional view of a surge pot in accordance with the invention arranged in a fuel tank.

FIG. 1 shows a surge pot 2 arranged a fuel tank 1 in a normal position. The fuel tank 1 has at the top a mounting opening 3 which is closed by a flange 4 of a fuel feed device 5. Between the flange 4 and the surge pot 2 there is guide 6 having a spring 7 which urges the surge pot 2 against the bottom of the fuel tank 1. Within the surge pot 2 there is arranged a fuel pump 8 which conveys the fuel via a forward line 9 to an internal combustion engine (not shown) of the motor vehicle. The flange 4 of the fuel feed device 5 is passed through by the forward line 9 and a return line 10 which leads back from the internal combustion engine.

The surge pot 1 has a container bottom 11 and a lateral walling 12, and is filled with fuel via the return line 10 and a bottom valve 13 arranged in the bottom 11 of the container. The walling 12 has a resilient insert 14 which extends around the entire circumference and is pressed outward in the normal position shown. In this way, the surge pot 2 is of a particularly large volume. If it is desired to remove the surge pot 2 from the fuel tank 1 through the mounting opening 3, the surge pot 2 can be easily brought into a narrow, elongated shape with which it can be conducted through the mounting opening 3 by turning the elastic insert 14 inside out.

Figure 2:
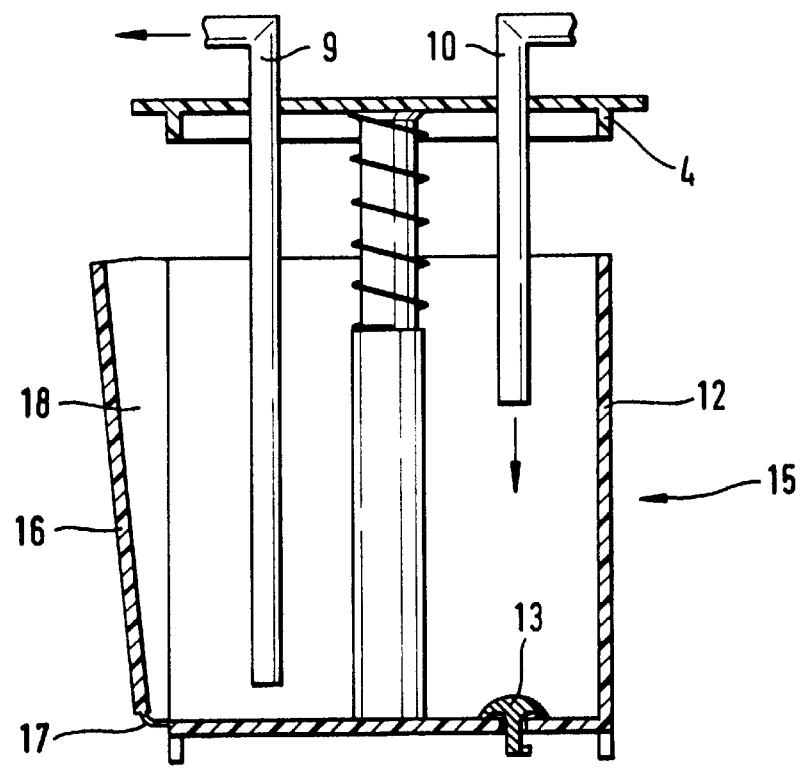
FIG. 2 shows a surge pot with a swingable side walling.

FIG. 2 shows a surge pot 15 in its normal position in which a flat wall 16 of its lateral walling 12 is fastened by a film hinge 17 to one edge of the bottom 11 of the surge pot container. The wall 16 is held swingably by the film hinge 17 and attached to stationary regions of the walling 12 via an elastic insert 18. The wall 16 is urged outward by the elastic insert 18 and thus prestressed into the expanded configuration of the surge pot 15 upon placement of the surge pot in the normal position of the surge pot 15.

Figure 3:
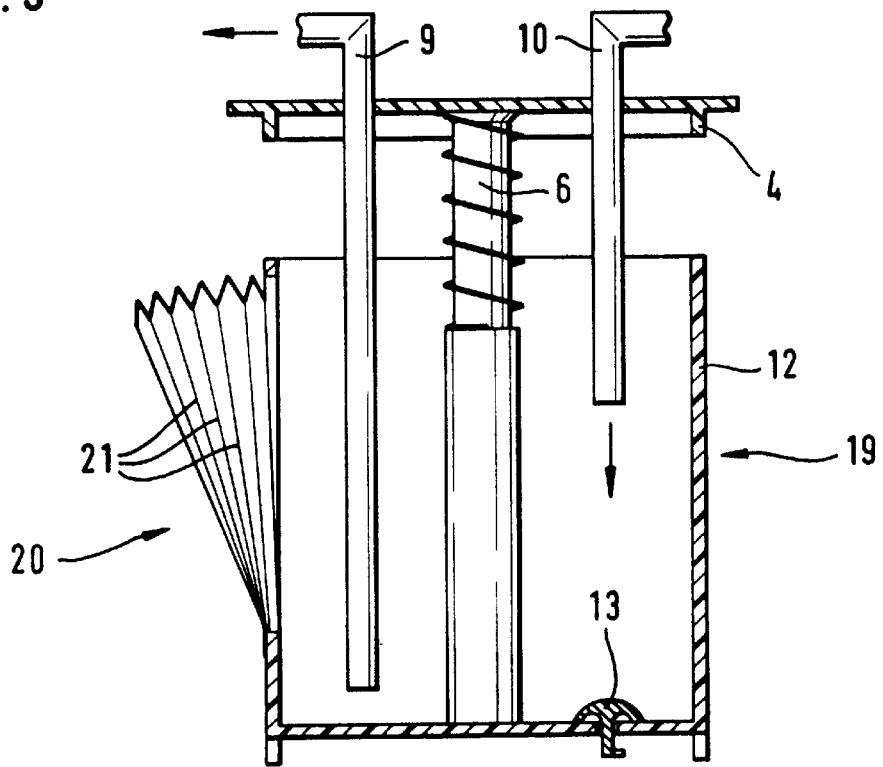
FIG. 3 shows a surge pot with a folded bellows.

FIG. 3 shows a surge pot 19 in which a part of its walling 12 is formed by a folded bellows 20 with folds 21 extending to the container bottom 11. The walling 12 of the surge pot 19 can thus be easily fanned open after mounting the surge pot 19 in the fuel tank 1 as shown for the surge pot 2 in FIG. 1.

I claim:

1. A surge pot to be arranged in a fuel tank of a motor vehicle, which surge pot is intended for passage through a mounting opening in the fuel tank, the surge pot comprising;
   a container bottom and a lateral walling, the walling having a resilient section expandable in a direction transverse to a direction of said passage, said resilient section being variable in size in said transverse direction from a first size insertable through said mounting opening to a second size larger than said mounting opening;
   wherein the surge pot is developed with a configuration which is variable from a surge-pot mounting position of relatively small cross section, intended for passage through a mounting opening of the fuel tank, into a normal surge-pot mounting position of relatively large cross section.

2. A surge pot, according to claim 1, wherein the resilient section of walling of the surge pot has at least one resilient insert.

3. A surge pot according to claim 2, wherein the resilient insert extends over an entire circumference of the walling of the surge pot.

4. A surge pot according to claim 2, wherein the walling comprises a film hinge, and at least one flat wall which is fastened to the walling swingable towards the outside of the surge pot by the film hinge to one edge of the container bottom in the normal position of the surge pot in the tank.

5. A surge pot according to claim 2 wherein the walling of the surge pot has a bellows with folds extending towards the container bottom.

6. A surge pot according to claim 1 made entirely of a resilient material.

7. A surge pot according to claim 1, further comprising a spring element for urging the walling into the normal position.

\* \* \* \* \*